United States Patent [19]

Ouderkirk et al.

[11] Patent Number: 4,902,378

[45] Date of Patent: Feb. 20, 1990

[54] POLYMER WITH REDUCED INTERNAL MIGRATION

[75] Inventors: Andrew J. Ouderkirk; John T. Simpson; Robert W. Warner; Douglas S. Dunn, all of St. Paul, Minn.

[73] Assignee: Minnesota Mining and Manufacturing Company, St. Paul, Minn.

[21] Appl. No.: 187,028

[22] Filed: Apr. 27, 1988

[51] Int. Cl.$^4$ .................................................. B44C 1/22
[52] U.S. Cl. ..................................... 156/643; 156/633; 156/668; 204/157.61; 204/157.15; 427/54.1; 427/322
[58] Field of Search ..................... 427/54.1, 322; 204/157.61, 157.15; 156/643, 633, 668

[56] References Cited

U.S. PATENT DOCUMENTS

| | | | |
|---|---|---|---|
| 2,876,187 | 3/1959 | Wolinski | 204/158 |
| 3,081,485 | 3/1963 | Steigerwald | 18/1 |
| 3,145,242 | 8/1964 | Bryan | 264/80 |
| 3,607,354 | 9/1971 | Krogh et al. | 117/47 |
| 3,914,521 | 10/1975 | Beatty et al. | 428/461 |
| 3,978,341 | 8/1976 | Hoell | 250/492 |
| 4,048,428 | 9/1977 | Baird et al. | 526/343 |
| 4,247,496 | 1/1981 | Kawakami et al. | 264/22 |
| 4,311,759 | 1/1982 | Glennon | 428/345 |
| 4,414,059 | 11/1983 | Blum et al. | 156/659.1 |
| 4,417,948 | 11/1983 | Mayne-Banton et al. | 156/643 |
| 4,482,204 | 11/1984 | Blyler et al. | 350/96.34 |
| 4,518,654 | 5/1985 | Eichbauer et al. | 428/331 |
| 4,568,632 | 2/1986 | Blum et al. | 430/322 |
| 4,631,155 | 12/1986 | Caines | 264/22 |
| 4,645,895 | 2/1987 | Boxman et al. | 427/37 |
| 4,710,563 | 12/1987 | Oetting | 528/501 |
| 4,822,451 | 4/1989 | Ouderkirk et al. | 427/54.1 |
| 4,824,699 | 4/1989 | Woo et al. | 427/54.1 |

FOREIGN PATENT DOCUMENTS

| | | |
|---|---|---|
| 33792 | 3/1980 | Japan . |
| 82380 | 4/1984 | Japan . |
| 101937 | 5/1984 | Japan . |
| 101938 | 5/1984 | Japan . |
| 760611 | 11/1956 | United Kingdom . |
| 1117354 | 6/1968 | United Kingdom . |
| 1149812 | 4/1969 | United Kingdom . |
| 1579002 | 11/1980 | United Kingdom . |

OTHER PUBLICATIONS

Journal of American Chemical Society, 104, 6784–6785 (1982), Srinivasan & Leigh.
Bishop & Dyer, Applied Physics Letters, 47, 1229 (1985).
Srinivasan & Lazare, Polymer, 26, 1297 (1985) Conference Issue.
Srinivasan, Journal of the Vacuum Society, B1, 923 (1983).
Day and Wiles, Journal of Applied Polymer Science, 16, 175 (1972).
Blais, Day and Wiles, Journal of Applied Polymer Science, 17, 1895 (1973).
Mimura et al., Japanese Journal of Applied Physics, 17, 541 (1978).
Lazare and Srinivasan, Journal Physical Chemistry, 90, 2124 (1986).
Kawamura et al., Applied Physics Letters, 40, 374 (1982).
Polymer Interface and Adhesion, Souheng Wu, published by Marcel Dekker, Inc. New York and Basel, Chapter 5, p. 206.
Yorkgitis et al., "Polymeric Film with Reduced Surface Friction," U.S. Ser. No. 25,884, filed Mar. 16, 1987.
Ouderkirk et al., "A Process for the Surface Modification of Semicrystalline Polymers," U.S. Ser. No. 25,874, filed Mar. 16, 1987.
Shinbach et al., "Heat Sealing of Semicrystalline Polymers," U.S. Ser. No. 26,051, filed Mar. 16, 1987.
Warner et al., "Surface Modification of Semicrystalline Polymers," U.S. Ser. No. 25,881, filed Mar. 16, 1987.
Ouderkirk et al., "Surface Modification of Semicrystalline Polymers," U.S. Ser. No. 25,845, filed Mar. 16, 1987.
Incremona et al., "Improved Adhesive Bonding to Polymer Surfaces," U.S. Ser. No. 25,847, filed Mar. 16, 1987.

Primary Examiner—Edith Buffalow
Attorney, Agent, or Firm—Donald M. Sell; Walter N. Kirn; Mark A. Litman

[57] ABSTRACT

Semicrystalline polymers and copolymers having migratory additives therein can be provided with reduced migration. A surface layer of the polymer of copolymer article is rendered quasi-amorphous and a film less penetrable by said migratory additives than the polymer or copolymer is adhered thereto.

7 Claims, No Drawings

POLYMER WITH REDUCED INTERNAL MIGRATION

BACKGROUND OF THE INVENTION

1. Field of the Invention

The present invention relates to polymeric articles, particularly poly(vinyl chloride) articles having additives which are capable of migrating out of the polymer, particularly plasticized poly(vinyl chloride) articles which have a surface treatment that prevents migration of the plasticizer out of the article.

2. Background of the Art

The effects of actinic radiation on the degradation of polymer surfaces have been studied for many years. Prior to about 1970, this work was done with low intensity photolamps at wavelengths greater than 220 nanometers (nm). Numerous papers are available in the literature, typical of which are Day and Wiles, *Journal of Applied Polymer Science*, 16 175 (1972), and Blais, Day and Wiles, *Journal of Applied Polymer Science*, 17 p. 1895 (1973).

Between 1970 and 1980 the effects on polymer surfaces of ultra-violet (UV) lamps with wavelengths less than 220 nm were studied for lithography and surface modification purposes. Such studies are exemplified by Mimura et al., *Japanese Journal of Applied Physics*, 17 541 (1978). This work illustrates that long exposure times and high energies are required to cause photoetching when UV lamps are used. U.S. Pat. No. 3,978,341 (Hoell) teaches an apparatus for exposing polymeric contact lenses to a spark discharge producing 83 nm to 133.5 nm U.V. radiation to improve the wettability and adhesiveness of the lenses.

In 1975 the excimer laser was discovered. An excimer laser is an excited dimer laser where two normally non-reactive gases (for example Krypton, Kr, and Fluorine, $F_2$) are exposed to an electrical discharge. One of the gases (Kr) is energized into an excited state (Kr*) in which it can combine with the other gas ($F_2$) to form an excited compound (KrF*). This compound gives off a photon and drops to an unexcited state which, being unstable, immediately disassociates to the original gases (Kr and $F_2$) and the process is repeated. The released photon is the laser output. The uniqueness of the excimer laser is its high efficiency in producing short wavelength (UV) light and its short pulse widths. These attributes make the excimer laser useful for industrial applications. Kawamura et al., *Applied Physics Letters*, 40 374 (1982) reported the use of a KrF excimer laser at 248 nm wavelengths to photo-etch polymethyl methacrylate (PMMA), a polymer used in preparing photolithography resists for semiconductor fabrication.

U.S. Pat. No. 4,414,059 (Blum, Brown and Srinivasan) disclosed a technique for the manufacture of microelectronic devices utilizing ablative photodecomposition of lithography resist amorphous polymers at wavelengths less than 220 nm and power densities sufficient to cause polymer chain fragmentation and immediate escape of the fragmented portions. The photodecomposition leaves an etched surface. The authors found that using an ArF excimer laser at 193 nm and with a 12 nanosecond pulse width, a threshold for ablatively photo decomposing poly(methylmethacrylate) resist material occurs at about a fluence of 10–12 mJ/cm$^2$/pulse. It is stated that large amounts of energy, greater than the threshold amount, must be applied before ablation will occur. The energy used must be (1) sufficiently great and (2) applied in a very short amount of time to produce ablative photodecomposition.

U.S. Pat. No. 4,417,948 (Mayne-Banton and Srinivasan) and a related publication, Srinivasan and Leigh, *Journal American Chemical Society*, 104 6784 (1982) teach a method of UV photo etching poly(ethylene terephthalate) (PET). In these publications the authors indicate the mechanism of photo etching to be one of chain scission or bond breaking of surface polymer molecules by the high energy UV. Bond breaking continues in the presence of irradiation and the smaller units continue to absorb radiation and break into still smaller units until the end products vaporize and carry away any excess photon energy. This process results in small particles being ablated away, and various gases being evolved. The remaining surface material comprises molecules of low molecular weight (oligomers). Examining the PET repeating unit and the author's claim of bond scission, it is believed that the following occurs:

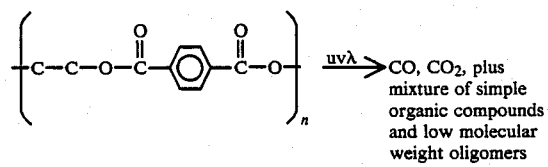

Indeed, in the *Journal of the American Chemical Society* article, the authors analyze for benzene and start detecting it at about the threshold for photodecomposition for PET; i.e., about 20mJ/cm$^2$/pulse at 193 nm. The authors also indicate that the photo etch process is accelerated in the presence of oxygen which seals the ends of the broken chain's fragments and prevents recombination of these fragments.

Srinivasan, *Journal of the Vacuum Society*, B1, 923 (1983) reports the results of ablative photodecomposition of organic polymers through a 0.048 cm diameter mask and states that a threshold exists for the onset of ablation and, for PMMA, that the threshold is 10mJ/cm$^2$/pulse. He then goes on to state that one pulse at 16mJ/cm$^2$ gave an etch mark on PMMA while 50 pulses at 4mJ/cm$^2$/pulse left no detectable etch marks. For PET and polyimide, the threshold began at about 30mJ/cm$^2$/pulse. However, for a satisfactory etch pattern the optimum fluence ranged from 100 to 350mJ/cm$^2$/pulse.

In Srinivasan and Lazare, *Polymer*, 26, 1297 (1985) Conference Issue, the authors report the photo etching of 6×12 mm samples of PET, PMMA and polyimide polymers with both continuous radiation at 185 nm from UV lamps and pulsed radiation at 193 nm from an excimer laser. The use of continuous low energy UV lamps causes photo oxidation of the polymer surface with a resultant increased oxygen to carbon ratio (O/C ratio) as determined by x-ray photoelectron spectroscopy (XPS) equipment, while the use of a pulsed high energy excimer laser, which produces chain scission in and ablation of the polymer surface, resulted in a lower O/C ratio as determined by XPS. The authors then go on to say "It may be pointed out that ablative photo decomposition is not exactly a method for the modification of a polymer surface at an atomic level since it totally eliminates the atoms at the surface and creates a fresh surface."

U.S. Pat. No. 4,568,632 (Blum, Holloway and Srinivasan) claims a method for photo etching polyimides. The process described uses a pulsed excimer laser at 193 nm. The stated incident energy required for photo ablation is much higher for polyimide than for PET. The value for the laser fluence threshold of PET was reported as about 30 mJ/cm$^2$/pulse while for polyimide it was reported as about 50 mJ/cm$^2$/pulse. An operative level was noted as about 50–100 mJ/cm$^2$/pulse for PET and 100–300 mJ/cm$^2$/pulse for polyimide. The etch rate found for PET was 1000 Angstroms for a fluence of 100–300 mJ/cm$^2$/pulse and for the polyimide was 750 Angstroms for 350 mJ/cm$^2$/pulse.

Lazare and Srinivasan, *Journal Physical Chemistry*, 90, 2124 (1986) report on the study of surface properties of PET which have been modified by either pulsed UV laser radiation or continuous UV lamp radiation. The authors report on the high fluence ablation of PET as follows: (1) the PET irradiated surface is a layer of low molecular weight material, (2) the surface has a rough chemically homogeneous texture, (3) the surface has a high chemical reactivity characteristic of oligomers, and (4) the surface could be removed by washing in acetone. Since extremely low molecular weight fragments (oligomers) of PET are soluble in acetone, the authors assert this removal of the treated surface is indicative of the presence of low molecular weight material on the surface. The authors also report that the low intensity UV lamp treated PET surfaces would not wash off with acetone. This later article reports thresholds for ablation of PET at about 30–40 mJ/cm$^2$/pulse.

Japanese Pat. Publications JA 60-245664, JA 59-82380, JA 59-101937 and JA 59-101938 (Kitamura, Veno and Nomura) describe the treatment of various polymers with many pulses from moderately high energy lasers for the purpose of increasing adhesion and forming a barrier layer to prevent plasticizer migration from within certain polymers. The energy dose of the treatment photoablates the surface, and causes yellowing of the surface No surface coating of any additional film material is described.

"Polymer Interface and Adhesion", Souheng Wu, Published by Marcel Dekker, Inc., N.Y. and Basel, Chapter 5, page 206 indicates that when a polymer melt cools and solidifies, an amorphous surface is usually formed, although its bulk phase may be semicrystalline. This is at least in part a result of fractions not accomodated in the crystalline structure being rejected to the surface. This amorphous surface is not recrystallizable because of the presence of the fractions and is believed to be extremely thin, corresponding to only a few layers of molecules, and is of the order of no more than 2 or 3 nm, and is generally less than 2 nm in thickness.

U.S. Pat. 3,081,485 describes a process for heating and softening polymeric materials using electron-beam irradiation so that further mechanical-treatment such as stretching and coating can be carried out. The energy densities used (e.g., column 2, line 15) are about two orders of magnitude higher than the energy densities used in the present invention. The energy levels used in U.S. Pat. No. 3,081,485 would cause ablation. The authors note on column 2, lines 26 ff. that small traces of irradiated material are evaporated during irradiation. Although the patent describes surface heating, the immediate depth of e-beam penetration (see column 3) appears to be greater than 150 microns. This form of energy would have equal effects on the bulk polymer and would not cause only surface modifications.

U.S. Pat. No. 4,631,155 describes the surface modification of polymers by subjecting the surface to at least one pulse of intense electromagnetic radiation. The surface polymer is disoriented during the relatively long exposure to radiation. Disorientation is indicative of an amorphous surface. Very thick amorphous layers appear to be formed as indicated by the chloroform test described in column 5.

SUMMARY OF THE INVENTION

A surface of a semicrystalline polymer containing additives or components capable of migrating to the surface of the polymer, particularly plasticized poly(vinyl chloride) article is rendered quasi-amorphous to a depth of at least 5 nm and is then coated with a barrier material such as a polymeric film. The presence of the coating on the quasi-amorphous surface of the article reduces migration of even monomeric plasticizers out of the polymer.

DETAILED DESCRIPTION OF THE INVENTION

The present invention provides an amorphized surface layer or region on a plasticized semicrystalline polymer, particularly a poly(vinyl chloride) polymer (PVC), formed by the irradiation of the polymer by radiation which is strongly absorbed by the polymer composition and of sufficient intensity and fluence to cause such amorphized layer. This amorphizing may be accomplished by rendering the surface truly amorphous, by ablation techniques shown in U.S. Pat. Nos. 4,568,632 and 4,417,948, or by the novel and unique process described herein. The semicrystalline polymer surface is thus altered into a new morphologic state by actinic radiation such as an intense short pulse UV excimer laser or short pulse duration, high intensity UV flashlamp. The amorphized surface of the article is coated with a material which forms a barrier such as a polyurethane or polyacrylate film.

The surfaces useful in the practice of the present invention all include quasi-amorphous regions In a preferred embodiment this region begins at the surface and comprises the entire top surface or region (if discontinuous). In other useful embodiments the quasi-amorphous region may lie immediately below or be part of a highly textured or chemically modified structure as would be produced according to the ablative procedure disclosed in U.S. Pat. No. 4,417,948, "Modification of Polymer Surfaces by Far-ultraviolet Radiation of Low and High (Laser) Intensities", R. Srinivasan and S. Lazare, *Polymer*, 1985, Vol. 26, Aug pp. 1297–1300; and "Ablative Photodecomposition", R. Srinivasan and W. J. Leigh, *J. Am. Chem Soc.*, 1982, 104 6784–6785. The useful surfaces according to these references can widely vary in their surface characteristics. These surfaces will contain zones or regions of quasi-amorphous polymer under polymeric decomposition debris and/or ablated surface areas. All products of this ablation technique will have significant, measurable amounts of polymer decomposition debris on the surface, in concentrations greater than present in the bulk polymer. This debris may be in the form of carboxyl groups, hydroxyl groups, lower molecular weight polymers or components, and the like. The polymers subjected to a rigorous ablative process as preferred by these references will have a surface with significant microstructuring thereon having average polymer molecular weights the same or less than that of the polymer in the bulk regions, and the surface exhibiting a lower oxygen/carbon ratio than the bulk material. The periodicity between peaks typically averages between 300 and 4000 nm and the average height (from valley to peak) of the microtexturing features is usually between 200 and 4000 nm. These materials, as well as the preferred structures being substantially free of polymer decomposition debris having quasi-amorphous areas which begin at the surface, are included within the description of a layer having a quasi-amorphous area of at least 5 nm in depth.

The residual debris denoted above would be organic material having a lower oxygen/carbon ratio than the bulk polymer. Even if not visually observable in the amounts present, the debris itself would be yellower in color than the bulk material and would be more highly conjugated. The debris also tends to leave microscopically observable (at least 10,000$\times$, preferably 20,000$\times$) artifacts on the surface recognizable as debris and not merely texturing. With respect to polyethylene terephthalate, ablation produces a surface substantially soluble in acetone, while the preferred quasi-amorphous surface is not soluble in acetone.

In understanding the present invention, a number of terms and concepts should be appreciated. The treatment of the surface of the PVC materials according to the present invention does not add or substantially remove material from the surface. Residual solvent or residual low molecular weight reactants and additives may be volatilized during this treatment, but there is less than 0.1% degradation (to a volatile state) and/or volatilization of the bulk of polymeric material having a molecular weight in excess of 10,000. The chemical modification of the polymer surface (e.g., oxidation, chain breakage) is minimal if there is any at all. Only a small amount of chain breakage occurs, without the generation of significant amounts (i.e., greater than 0.1% by bulk weight) of materials volatilized during the process from the quasi-amorphous region.

The terms amorphous, crystalline, semicrystalline, and orientation are commonly used in the description of polymeric materials. The true amorphous state is considered to be a randomly tangled mass of polymer chains. The X-ray diffraction pattern of an amorphous polymer is a diffuse halo indicative of no regularity of the polymer structure. Amorphous polymers show softening behavior at the glass transition temperature, but no true melt or first order transition.

The semicrystalline state of polymers is one in which long segments of the polymer chains appear in both amorphous and crystalline states or phases. The crystalline phase comprises multiple lattices in which the polymer chain assumes a chain-folded conformation in which there is a highly ordered registry in adjacent folds of the various chemical moieties of which the chain is constructed. The packing arrangement (short order orientation) within the lattice is highly regular in both its chemical and geometric aspects. Semicrystalline polymers show characteristic melting points, above which the crystalline lattices become disordered and rapidly lose their identity. The X-ray diffraction pattern of semicrystalline polymers (or copolymers) generally is distinguished by either concentric rings or a symmetrical array of pots, which are indicative of the nature of the crystalline order.

Orientation of the polymer is the directional alignment of the polymer chain (long-range order) or segments of the polymer (chain) within the polymer composition. In the quasi-amorphous state described in the practice of the present invention, it appears that the overall long-range order orientation or ordering of the crystal lattice remains in an apparent crystalline orientation. It also appears that there is, however, significant localized disordering along the chain (short-range order orientation). The quasi-amorphous form thus exhibits short-range order non-orientation or low orientation typical of amorphous phases while it exhibits long-range ordering typical of crystalline structures. These characteristics are observable and determinable by single analytic techniques or combinations of techniques such as X-ray diffractions, spectromicrophotometry, IRRAS, NMR, solvent extraction, and the like.

The surface of the semicrystalline polymer is converted into its quasi-amorphous form by heating and rapid cooling of a determined amount of that surface. A determinable depth of the polymer composition is converted to the quasi-amorphous state. The conversion is referred to as "amorphizing." The thickness of the amorphized polymer, as measured from the surface downward into the bulk of the polymer, can be controlled. The polymer usually has a quasi-amorphous top surface having a depth of at least 5 nm, preferably at least 10 nm, more preferably at least 40 nm and most preferably at least 60 nm. The range of thickness for the quasi-amorphous phase or surface of the polymer may be from about 5 to 10,000 nm, preferably 10 to 1,000 nm, more preferably 20 to 500 nm or 20 to 100 nm and most preferably 20 to 250 nm, depending upon the ultimate use of the article.

The surface quasi-amorphous layer is firmly adhered to the bulk of the semicrystalline polymer because of the in situ nature of the conversion. There can even be a discernible gradation zone between the quasi-amorphous and semicrystalline areas, although this is not always the case. That is, the transition can be very abrupt within the polymer.

The portion of the surface area which is amorphized may be as small as 1% with some beneficial effects being noted. Generally it is at least 3%, and preferably 5 to 100% of the surface. More preferably at least 30% or 50 to 100% of the surface is quasi-amorphous. These are percentages by surface area. In reducing plasticizer migration, the greater the percentage of the surface area amorphized, the greater the effect. Treated areas of at least 50, 70 or 90% are quite beneficial.

In performing the process of making the quasi-amorphous surfaces of the present invention, the wavelength of the ultraviolet radiation and/or the polymer and/or absorbing dye in the polymer should be chosen so that the polymer composition exhibits an extinction coefficient greater than about 5,000. The higher the extinction coefficient for any given wavelength, the thinner is the surface layer which resides in the optical path of the radiation, and correspondingly, the thinner is the surface layer which undergoes a morphological transition or "amorphization". The wavelength range of preferred interest is between about 180 and 260 nm, with the highest extinction coefficient being manifested at the shorter wavelengths. Preferably a coefficient of extinction of at least 10,000 is exhibited by the polymer at the wavelength of irradiation.

When utilizing ultraviolet radiation (e.g., 193 nm), it is desired that the polyester film receives energy corresponding to a fluence of 3-25 mJ/cm$^2$/pulse. At fluences of less than 3 mJ/cm$^2$/pulse, the effect of the radiation is not readily discerned. At fluences greater than 25 mJ/cm$^2$/pulse, one begins to encounter excessive damage to the affected surface layer, such as vaporization (e.g., off-gassing) of low molecular weight products of photodegradation, substantial reduction of the molecular weight of the surface layer, and more extensive surface roughening.

The radiation pulse duration, i.e., the pulse width, should be in the range of 10 nanoseconds to 100 microseconds to assure rapid excitation of the affected surface layer.

The net effects of pulse width, coefficient of extinction, and radiation intensity are to produce a particular type of mechanistic events. First, and to a minor degree, there is a photolytic effect in which absorbed radiation energy causes random bond scission to occur in the semicrystalline polymer. This effect is desirably minimized in the practice of the present invention to minimize the damage to polymer properties caused by this effect. Indeed, operation of the present invention under ideal conditions has been found to cause some decrease in the oxygen-to-carbon ratio, but sensitive ellipsometric and gravimetric measurements have been unable to detect any significant loss of material as a result of proper radiation conditions. However, the surface layer undergoes some controlled degree of decomposition as reflected in less than about a 50% decrease in its number average molecular weight.

The second effect is a result of the unusual nature of the thermal excitation of the surface layer in the optical path of the radiation. Much of the absorbed light energy is translated into heat, with the heating cycle corresponding to the pulse width of the radiation. It is certain that instantaneous temperatures that far exceed the normal melting point of the polymer (e.g., for poly(ethylene terephthalate) that is about 260° C.) are reached throughout most of the affected volume, although an unusual thermal gradient may be produced within that volume because of the rapid attenuation of the incident energy due to light extinction by the polymer composition. The heat cycle thus corresponds to the pulse width, in a range of from about 10 nanoseconds to 100 microseconds. After the heating cycle, the next phenomic concern is the ensuing cooling cycle. Because of the thin nature of the affected volume and its contact with ambient air at the surface and bulk material (which are usually at room temperature), it can be estimated that the surface probably cools down to the glass transition temperature (e.g., for poly(ethylene terephthalate) this is about 75° C.) within microseconds. Once below this temperature, polymer chain conformations tend to be frozen. Considerations with respect to this unusually brief thermal cycle indicate that conformational changes available to the polymer chains remain highly restricted during the brief period while the affected surface area undergoes this excitation. Short segmental motions, e.g., of the 'crankshaft' rotational type, have extremely short relaxation times, and it is expected that they may readily occur within the time-temperature regime created in the practice of the process of the present invention. The confirmation that such motions do indeed occur is provided by the IRRAS spectroscopic studies that show that there is a significant trans-to-gauche-conformer transformation in the surface layer which results from the irradiation of semicrystalline film (e.g., biaxially oriented poly(ethylene terephthalate)) with an ArF excimer laser.

This type of conformational change requires the rotation of a short segment of the PET chain involving only a few carbon or oxygen atoms. Similar considerations indicate that it is highly unlikely that the pre-existing crystallites or crystal lattices in the affected surface layer undergo any major spatial rearrangements because this time-temperature regime precludes the type of long range translational and large chain segment rotational motions which would materially change the pre-existing packing arrangement within the crystal lattice. Thus, it strongly appears that the pulsed UV irradiation of PET (and probably all semicrystalline polymers having appropriate extinction coefficients) provides films having surface layers with a unique morphology (i.e., quasi-amorphous) in which the polymer chains are highly disordered over short segment lengths, but substantially retain the long-range order that existed between chains and over long segment lengths of those chains prior to excitation. Indeed, the excimer laser treatment of a thin film of thermally crystallized PET indicated that the original spherulitic structure remained intact, tending to affirm this description.

The substantial trans-to-gauche-conformer transformation which is caused by excimer laser excitation is a clear indication of short range chain conformation disordering, suggesting that although the crystallites may have undergone short range disordering, the longer range 3-dimensional packing order probably remains virtually intact. It is for this reason that the surface is referred to as quasi-amorphous since it has physical characteristics embodying some crystalline properties, and yet displays predominantly amorphous properties.

The volume of polymer affected or converted (i.e., the affected surface layer or area) by the process of the present invention is defined as being in a 'quasi-amorphous' state because the highly ordered registry of identical chemical moieties in adjacent folds of the chain-folded crystal lattice is largely destroyed, but the overall 3-dimensional architecture of the crystal lattice is preserved. Thus, the chemical disordering which occurs as a result of the radiation is characteristic of an amorphous state, while the retention of longer range geometric order resembles a pseudo-crystalline state. The layers or regions are neither totally amorphous nor totally crystalline in the classic sense of those words. In this specification where quasi-amorphous layers or regions produced in the practice of the present invention are discussed, those regions may be referred to as quasi-amorphous layers or regions because their chemical properties tend to resemble amorphous compositions rather than crystalline compositions, but amorphous and quasi-amorphous are distinctly different as noted in the description of quasi-amorphous materials given above.

Quasi-amorphous is a state which is between semicrystalline and amorphous. It is more difficult to distinguish from a true amorphous state than a semicrystalline state, but a clear distinction can be drawn.

The quasi-amorphous layer must, of course, be formed from a semicrystalline state. The semicrystalline state may be a uniaxially oriented film, biaxially oriented film, or contain grossly unoriented crystallites (e.g., spherulitic crystallites randomly distributed throughout the film). When such a semicrystalline film is converted by the process of this invention (in whole or in part, as on one surface only) to the quasi-amorphous form, the quasi-amorphous areas will appear to be amorphous except that they will retain a latent memory for the crystallite orientation. This is a definitive distinction from the true amorphous state.

For example, oriented film will display anisotropy with respect to the absorption of infrared radiation (e.g. between 5,000 and 16,000 nm) in various directions in the film. Biaxially oriented film would most significantly display this anisotropy between the unoriented thickness dimension (e.g., the Z-axis) and the oriented length and width dimensions (e.g., the X- and Y-axes) of the film. When such an oriented film is quasi-amorphized according to the present invention to a state most closely resembling a true amorphous film (e.g., the entire thickness or a larger thickness is repeatedly treated without ablation of the film is quasi-amorphous), the film or layer will appear to be amorphous. However, the film or layer will not be truly amorphous because it will retain a latent memory for the crystallite orientation, in this case being evidenced by a latent memory for the anisotropic orientation of the original semicrystalline polymer.

When this quasi-amorphous layer or film is heated to promote recrystallization, the film or layer will begin to regain its original crystallite distribution or in the case of oriented film, regain at least part of its anisotropic orientation. When a truly amorphous layer is reheated, it will not develop anisotropy. Where the semicrystalline polymer film originally contained grossly unoriented crystallites, reheating of the quasi-amorphous layer or film would return such a crystallite orientation to the layer or film.

The process appears to work by the semicrystalline polymer's composition absorbing the energy of the irradiation within a limited depth of the irradiated surface. The energy is of sufficient intensity and duration to melt polymer, but of insufficient intensitiy and duration to evaporate, significantly chemically modify, or ablate polymer When the irradiation stops, the melted polymer rapidly cools without crystallization. No special cooling of the melted layer usually needs to be performed as the melted layer is usually sufficiently thin that ambient air and adjacent bulk polymer temperatures will cool it sufficiently rapidly. Forced cooling can be used on thicker layers if desired or can be used on thin layers to insure even more rapid cooling.

The semicrystalline polymer composition should be able to absorb the irradiation used in the process. The more highly absorptive the polymer is of the radiation, the greater the concentration of the process to the surface of the polymer. In general, the polymer should be able to absorb sufficient energy to cause melting of the surface and yet not absorb radiation at such a high level as would cause ablation, excessive degradation, or volatilization of the polymer. For example, a polymer may absorb at least 5% of incident radiation in a 1 micron thick film when the radiation is applied at a rate of 1 Joule/cm$^2$. Absorption of the radiation may be enhanced by the addition of radiation absorbing materials, for example, plasticizers, dyes and pigments to the polymer. These, and other, radiation abosrbing materials can have some noticeable effect at levels as low as 0.05% by weight, but can also be used at higher levels, even up to 90% by weight and higher. For example, a polymer used to modify a pigment may be treated after it has been combined with the pigment. A generally preferred range would be from 0.1 to 50% by weight for such radiation absorbing additives.

The quasi-amorphous surface layer on the semicrystalline polymer base is unique because (1) it exists without substantial change of the surface chemical structure while the bulk properties of the polymer are unchanged, (2) it has a lower softening temperature than the semicrystalline polymer, which lower softening temperature allows auto adhesion at a temperature below that at which the bulk film would autoadhere, (3) it is more easily swelled by organic solvents which allows a high degree of bond entanglement with itself and with other coatings and polymers, (4) the controlled depth of amorphization serves to limit the depth of solvent penetration and hence limits the effect of solvents on the quasi-amorphous layer, and (5) it has a reduced optical index of refraction which is graded from the bulk to the surface.

The amorphized surface of the PVC substrate of the present invention has characteristics and features which tend to be different from those products capable of being produced by prior art processes. For example, it has been noted that the depth of the quasi-amorphous areas is at least five (5) nanometers. This tends to be an inherent result of the process. The previously referenced work reported by Wu concerning truly amorphous surfaces generated by non-crystallizable fractions being forced to the surface produces very thin amorphous layers. The thickness of these layers is never more than 3 nm and is usually less than 2 nm. Additionally, the chemical make-up of the surface region is significantly different from that of the bulk polymer because of the concentration of non-crystallizable fractions at the surface. The surface produced by this prior art phenomenon would have a weight average molecular weight more than 50% different from the weight average molecular weight of the associated bulk semicrystalline polymer. The surface produced by the practice of the present invention would have a difference of less than 50% between the weight average molecular weight of the surface quasi-amorphous layer and the bulk semicrystalline polymer.

Another characteristic of the treated surface of the substrates of the present invention which sometimes can be observed but is unique to those articles of the present invention is the similarity between the molecular orientation of the surface quasi-amorphous layer and the semicrystalline polymer in bulk. Polymer orientation relates to the degree to which polymer chains are statistically or more predominantly oriented or aligned within the polymer. Ordinarily, when crystalline polymers are melted, the orientation in the crystalline and amorphous phases is randomized and is significantly different from the orientation of semicrystalline polymers. Observations of the amorphized surfaces in the practice of the present invention indicate that the orientation within the quasi-amorphous layer remains similar to that of the semicrystalline polymer. Microscopic examination under cross-polarizers shows that the orientation of the quasi-amorphous layer is similar to or indistinguishable by visual observation from the orientation of the semicrystalline polymer. The physical properties of the quasi-amorphous layer, such as its index of refraction, infrared absorption spectrum and solubility clearly show that the layer is in fact in an amorphous-like state.

Corona discharge treatment of polymer surfaces does not necessarily render surfaces amorphous, but oxidizes the surface of the polymer. Corona treatment tends to have its most significant oxidative effect to a depth of about 2 nm. The corona treatment creates or adds functional groups to the polymer as a result of reactions with the environment in which the discharging is performed. For example, functional groups such as carboxylic groups, phenol groups, hydroxyl groups, carboxyl groups, and amide groups can be added to the polymer by the corona treatment. These groups would not be a direct product of the process of the present invention. Corona treatment of the amorphous surfaces of the present invention would generate such functional groups and would not necessarily crystallize the surface. Corona treatment of poly(ethylene terephthalate) and other polymers also changes the optical density of the surface layer because of the formation of these new chemical materials in that surface. As compared to the bulk polymer, the optical density of the surface layer may increase by 0.2 within a 50 nm region of the visible portion of the electromagnetic spectrum (particularly in the yellow region).

Both corona discharge and flame treatment can significantly modify the chemical composition of the polymer in the surface regions treated. Corona discharge can degrade or crosslink the polymer, creating a lower or higher crosslink density in the surface than in the bulk polymer. The article of the present invention, unless further treated as by corona discharge, will have approximately the same crosslink density in the amorphous surface layer as in the bulk polymer region. This change in crosslink density can be observed in the surface layer by a reduced tendency or ability to recrystallize. Plasma, and ion implantation treatments have effects on the crosslink density similar to those generated by corona discharge.

Flame treatment of polymeric surfaces (such as that reported in U.S. Pat. No. 4,568,632) is a much more destructive and chemical composition altering process than the process of the present invention. The patent describes the ablation of materials from the surface during treatment. This is probably the combined result of evaporation, oxidation, polymer chain breakage, and other destructive processes. This process would cause the formation of the functional groups described above and probably cause a significant overall change in the molecular weight and chemical make-up of the polymer on the surface, probably to a depth of about 2 nm. The flame treatment as presently practiced also causes a change in the optical density of the polymer on the surface due to the change in the chemical composition of that surface layer. That change in optical density is at least about 0.2. In the practice of the present invention, the quasi-amorphous layer produced on the surface has an optical density which is within 0.1, preferably within 0.08, more preferably within 0.05 and most preferably within 0.03 units of the bulk polymer. Additional treatment (e.g., corona discharge or coloration with dyes or pigments) could, of course, be used to change that value. But in the absence of dyes or pigments differentially distributed between the quasi-amorphous layer and the bulk layer, there should be little or no difference in optical densities.

In the preferred fluence range of the present invention, the most notable result is the formation of a new morphological state of the polymer within the surface layer (i.e., a quasi-amorphous, deoriented or oriented glass) which resides in the optical path of the radiation and begins at the surface of the polymer. This morphological transition is attended by some extremely mild degradation, as attested by the diminution of the O/C ratio (XPS analysis and solvent extraction data). The failure to detect weight loss by gravimetric and ellipsometric measurements indicates that gas evolution is, at most, a minor event. Similarly, IRRAS spectra show evidence of only a topographic morphological rather than any chemical change of the polymer. The change in the O/C ratio is quite different from that occurring with flame treatment or corona discharge where the atom/atom, oxygen/carbon ratio increases. This increase may be very small, but in most thorough treatments there is a change in the ratio of about 0.1 or 0.2. The O/C ratio may actually decrease in the amorphous layer as compared to the bulk polymer.

The remarkable aspects of the surface layer produced in this invention are: (1) its unchanged texture; (2) its unchanged optical absorption or scattering characteristics, and (3) its substantially unchanged molecular weight. Each of these aspects can be very important. For example, film roughness is very injurious to the gloss of PVC used in sign making. Film yellowing or scattering (i.e., haze) on the other hand cannot be tolerated where the film is used as a substrate in the manufacture of graphics products, e.g., signs, decals, and the like. Finally, the absence of a major fraction of low molecular weight oligomeric products avoids the situation where subsequently applied functional coatings fail in use due to inherently poor adhesion or solvent resistance which stems from the weak boundary layer present at the coating/film interface.

The quasi-amorphous surface of the polymer also reduces the reflectivity of that surface. Normal, smooth uncoated polymer films will have a reflectivity of 10% or more. Highly texturized polymer surfaces can reduce this reflectivity, but cannot present a smooth surface, that is a surface having no texture which is easily visible with a scanning electron microscope at 10,000× magnification. The polymer films of the present invention can provide smooth surfaces with reflectivities of 9% or less to 550 nm light at 80-90° incident angles.

The process of the present invention also tends to not modify the surface roughness of the polymer. The surface structure, before and after amorphizing, tends to be the same in the practice of the present invention. Surfaces with a high degree of surface roughness may be somewhat softened in their features, but will still tend to have rough surfaces. Smooth surfaces will be substantially unchanged with respect to the absence of features on their surface. Flame treatment would tend to greatly modify the surface features of the surface so treated.

The process of producing this invention is an advance over prior methods of surface modification such as sputter etch, plasma, corona, chemical, flame and solvents because no vacuum is required, no contact with the surface is required, no chemistry is added to the treated polymer so that it is more likely to be recyclable, and there are no known environmental problems.

Polymers generally can be either semicrystalline or amorphous. These categories are descriptions of the degree of ordering of the polymer molecules. Amorphous polymers consist of randomly ordered molecules. That is, the polymers are of low order or non-ordered and are independently surrounding and intertwined with other molecules. Semicrystalline polymers consist of a mixture of amorphous regions and crystalline regions. The crystalline regions are said to be more ordered and the molecules actually pack in some crystalline-like structures. Some crystalline regions may be more ordered than others. If crystalline regions are heated above the melting temperature of the polymer, the molecules become less ordered or more random. If cooled rapidly, this less ordered feature is "frozen" in place and the resulting polymer is said to be amorphous. If cooled slowly, these molecules can repack to form crystalline regions and the polymer is said to be semicrystalline. Some polymers are always amorphous. Some polymers can be made semicrystalline by heat treatments, stretching or orienting and by solvent inducement, and the degree of crystallinity can be controlled by these processes.

Any semicrystalline polymer which contains additives which can migrate to the surface and off the surface of the polymer can benefit by the present invention. This type of problem is often referred to as blushing, blooming, powdering or dusting in the art. The loss of materials from within the polymer alters the physical and/or chemical properties of the bulk polymer, and the transferal of materials to the environment around the polymer can adversely affect the performance and/or appearance of other materials. Typical polymers which are particularly adversely affected by the loss of ingredients are poly(vinyl chloride), cellulose acetate (and its esters such as cellulose acetate butyrate), poly(vinyl alcohol), polyamides, and the like.

Typical functional materials which are included within polymeric materials and which tend to migrate out of the bulk polymer include plasticizers, lubricants, coating aids, surfactants, antioxidants, radiation (e.g., ultraviolet) absorbers, stabilizers, and the like. These materials which have a tendency to migrate to the surface of a polymer within which they are carried in are called "migratory" materials according to the present invention. Examples of some of these materials are listed below.

Amongst the better known plasticizers and softeners are tall fatty acids, phenolic resins, vegetable oils, dipropylene glycol dibenzoate, paraffinic oils, butyl oleate, butyl stearates, aromatic hydrocarbon oil, sulfur-reacted vegetable oil, napthenic oils, coumarone-indene resins, phthalate esters, polyesters, silicate blends, organic phosphates, wood rosins, epoxidized plant oils, pine tars, and trimellitates. Amongst the lubricants are paraffin waxes, stearates, silicones, polyalkylene glycols, and polytetrafluoroethylene. Well known chemical and heat stabilizers include zinc organic complexes, barium cadmium complexes, organo-tin compounds, phosphites, phenolic resins, brominated organics, lead phosphites, fatty esters, epoxidized vegetable oils, and phosphates. Antioxidants and inhibitors include highly functional hindered phenols, alkylated diphenylamines, alkylated-arylated bisphenolic phosphites, polymeric phenolic functionalized quinolines, microcrystalline wax, alkylated quinones, alkylated thiodiopropionates, phenolic amines, and hindered thiobisphenols. These are of course only examples of the many different types of migratory materials known in the art to be usefully included in polymeric compositions. Usually these materials are present as at least 0.5% by weight of the polymeric composition. Many are present in amounts of at least 1%, preferably at least 2% by weight and are used in concentrations of up to 20 or 25% by weight of the polymeric composition.

One aspect of the uniqueness of the present invention is the reversal of the above crystallization process to transform a thin surface layer of semicrystalline polymer into a quasi-amorphous thin surface layer residing on nonaffected bulk semicrystalline polymer.

There are two necessary conditions required of the radiation source to provide the treatment of the present invention. Both high intensity (high power per unit area) and high fluence (high energy density per pulse) are required of the radiation source. These requirements assure that a substantial amount of heat generated in the very thin surface of treatment stays in the surface. The effect of the radiation is to concentrate energy into the surface layer. Thermal diffusion into the bulk reduces this concentration of energy and makes the process less efficient. It is, therefore, desirable that only a small amount of heat be dissipated into the bulk of the polymer during irradiation. The more heat that is transferred to the bulk during the surface irradiation, the less efficient the process becomes until so much heat goes to the bulk that the process no longer works. Because of this requirement to rapidly heat only the surface layer and not the bulk of the polymer, conventional high intensity UV sources such as mercury arc lamps and common Xenon flash lamps with their inherently long pulse widths result in rapid diffusion of the thermal energy into the bulk polymer. Without significant modification of these sources, these properties prevent a high concentration of energy being achieved at the surface without destroying the surface of the polymer.

The UV excimer laser is capable of producing high intensity, high fluence radiation on the surface of the polymer to be treated. The polymer composition used with a UV excimer laser must be semicrystalline and UV absorbing at the UV laser wavelengths. The result of the laser pulse interacting with the surface is a combination of photolyzation and heating. In other words, the short intense pulse significantly heats the surface of the polymer, but not the bulk, above the polymer melting temperature, and some surface molecule chain scission occurs. During the brief time the surface region is heated above its melting temperature, the molecules can randomize themselves into a disordered condition and broken bonds reconnect, although not necessarily to the same end from which they were broken or to the same degree. The temporarily broken molecular bonds will assist this melting process. After irradiation the surface layer will rapidly cool, and "freeze" the new disordered layer into an amorphous structure. That is, the cooling rate is fast enough so the surface layer cannot recrystallize. The irradiation thus produces a quasi-amorphous layer on the bulk polymer which layer undergoes only a small change in molecular weight because of the recombination of bond scissions and no chemical changes such as the addition of ions. The surface texture undergoes no significant change because no material has been removed or ablated and both melting and cooling occur over a short period of time.

The laser treated surface can be shown to be quasi-amorphous by a number of tests: (1) it washes off with solvents that only the amorphous form of the polymer is soluble in, (2) infrared reflection absorption spectroscopy (IRRAS) of the surface indicates the same pattern in the surface layer as is normally exhibited by the amorphous form of the polymer, and (3) thin film ellipsometry of the surface gives the same refractive index as does the amorphous form of the polymer.

XPS measurements of the treated surface indicates no significant chemical changes by addition. It also shows that a small O/C ratio change has occurred which indicates some small amount of surface decarboxylation of the plasticizer. Gel permeation chromotography (GPC) chloroformextracted PET film shows only a small molecular weight decrease as compared to the untreated polymer. Water contact angle measurements show no change in the treated surface which means the surface has not been roughened significantly and that functionality groups have not been added. As viewed at 32,000× magnification, slight texturing on an extremely fine scale is observed, with no features greater than 700 Angstroms or 600 Angstroms in height, and most (more than 50%) of all features having a height of less than 300 Angstroms. Shadow mask Transmission Electron Microscopy (TEM) indicates peaks and valleys on the surface of about 300 Angstroms. In still other cases, similar treated PET film displays completely smooth, essentially featureless surfaces.

Early investigations of laser treatments of polymers were concerned with etching or ablation of the polymer and thus used laser intensities and fluences much higher than required for the present invention. These investigators found a fluence threshold for ablation which of course was different for each polymer treated. Below this threshold no ablation would take place. Investigation was never made to determine what actually was occuring at lower fluences. It has been found that like the fluence threshold for ablation, there is likewise a fluence threshold for the amorphization of this invention and it too varies with the polymer being treated.

The UV radiation source can be by excimer laser or flashlamps at wavelengths less than 320 nm. The pulse widths should be less than 100 microseconds. Typical pulse widths are 7.5 microseconds for flash lamps and 10–80 nanoseconds for an excimer laser.

The amorphizing of the surface of the PVC film greatly improves its adhesion to polymeric materials. Almost all polymeric materials, except possibly polymers designed to have poor adhesion to other materials (e.g., polytetrafluoroethylene), adhere very strongly to the treated surface upon the application of heat and pressure. It has thus been shown that substantially any polymeric material, whether laminated as a film, extruded as a hot-melt adhesive, or coated out of solvent adheres more strongly to the treated PVC surface than to an untreated PVC surface. Any polymer which is less penetrable by the plasticizers in the PVC film than the PVC composition itself can thus be used to reduce plasticizer migration. A film is less penetrable by the plasticizer if an eight micron film of the material containing 20% by weight of the plasticizer loses 10% by weight less of the plasticizer in a sixteen hour period in the solutions and under the conditions described in Example 1 than a PVC film of equal dimensions. If the plasticizer cannot be carried in the polymer (e.g., it is insoluble or immiscible), lower penetrability can be determined by comparing a PVC coated layer (with low plasticizer levels) to a coating layer of the polymer. Both of these coating layers would be on a PVC film having at least 20% by weight of plasticizer therein. Any film which would allow less than 90% of the amount of plasticizer lost by a PVC cover film to be lost would be a less penetrable polymer.

The coating polymers of choice would be poly(acrylic) and polyurethane polymers. Any polymer containing at least twenty-five molar percent of units derived from moieties having units of the formula

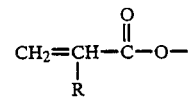

wherein R is H or $CH_3$ is an acrylic material. This term is clearly inclusive of acrylic and methacrylic polymers and copolymers. Exemplary acryloyl and methacryloyl monomers would be acrylic acid, methacrylic acid, acrylic anhydride, ethylacrylate, n-butyl acrylate, n-butyl methacrylate, isooctyl acrylate, dodecyl methacrylate, and multifunctional acrylates such as ethylene glycol dimethacrylate, propylene glycol dimethacrylate, butylene glycol dimethacrylate, neopentyl glycol dimethacrylate, hexylene glycol dimethacrylate, diethylene glycol dimethacrylate, triethylene glycol dimethacrylate, tetraethylene glycol dimethacrylate, polyethylene glycol dimethacrylate, trimethylol ethane trimethacrylate, tetramethylol methane trimethacrylate, tetramethylol methane tetraacrylate, trimethylol propane monococonut oilate dimethacrylate, 2,2'bis(4-methacryloxy diethyoxyphenyl) propane, ethylene glycol diacrylate, butylene glycol diacrylate, neopentyl glycol diacrylate, propylene glycol diacrylate, hexylene glycol diacrylate, diethylene glycol diacrylate, triethylene glycol diacrylate, tetraethylene glycol diacrylate, polyethylene glycol diacrylate, polypropylene glycol diacrylate, 2,2'bis(4-acryloxy propyloxyphenyl)propane, 2,2'bis(4-acryloxy diethoxyphenyl)propane, trimethylol propane triacrylate, trimethylol ethane triacrylate, tetramethylol methane triacrylate, and tetramethylol methane tetraacrylate. These acrylic materials and particularly the acrylate esters may be copolymerized with all those comonomers known to be polymerizable with acrylic groups such as phenols, glycols, polyglycols and the like.

The coatings on the substrates sometimes exhibit actual grafts between the two polymeric materials. That is, chemical bonds can actually occur on a significant level between the coating and the amorphous layer. This is particularly true where a polymerizable composition is polymerized or cured on the surface of the amorphous layer to form the antimigratory coating.

Polyurethanes are materials formed as the reaction product between organic polyisocyanates and organic polyhydroxyl compounds. These materials are well known in the art. A good description of polyurethanes and their chemical formation may be found in U.S. Pat. No. 3,808,162.

The polymer surfaces treated in accordance with the practice of the present invention may advantageously be further coated with an adhesive, particularly a pressure-sensitive adhesive. The adhesive would of course be best used on a film or sheet treated according to the present invention. The adhesive may be applied to the back side of the film or sheet to provide a tape with the barrier surface exposed. It is most preferred, however, to apply the adhesive to the barrier layer. This reduces migration of components between the film or sheet and the adhesive. This is particularly important in pressure-sensitive adhesive tapes since the migration of plasticizers and the like from the film or sheet into the adhesive can significantly alter the physical properties of the adhesive. Such variations in properties, either increasing or decreasing adhesion, modifying the coherence of the adhesive, changing the adherence of the adhesive to the base, or the like, is undesirable.

Pressure-sensitive adhesives are art recognized as a standard class of materials. These are adhesives which in dry (substantially solvent free except for residual solvent) form are aggressively and permanently tacky at room temperature (e.g., 15° to 25° C.) and firmly adhere to a variety of dissimilar surfaces upon mere contact without the need for more than manual pressure. They require no activation by water, solvent or heat in order to exert a strong adhesive holding force towards such materials as paper, cellophane, glass, wood and metals. They have a suficiently cohesive holding and elastic nature so that, despite their aggressive tackiness, they can be handled with the fingers and removed from smooth surfaces without leaving a substantial residue (cf. Test Methods for Pressure-Sensitive Tapes, 6th Ed., Pressure Sensitive Tape Council, 1953). Pressure-sensitive adhesives and tapes are well known, and the wide range and balance of properties desired in such adhesives has been well analyzed (cf. U.S. Pat. No. 4,374,883; and "Pressure-Sensitive Adhesives" in *Treatise on Adhesion and Adhesives* Vol. 2, "Materials", R. I. Patrick, Ed., Marcel Dekker, Inc., N.Y., 1969). The various materials and compositions useful as pressure-sensitive adhesives are available commercially and are thoroughly discussed in the literature (e.g., Houwink and Salomon, *Adhesion and Adhesives*, Elsevier Publ. Co., Amsterdam, Netherlands, 1967; Handbook of Pressure-Sensitive Adhesive Technology, Donates Satas, Ed., VanNostrand Reinhold Co., N.Y., 1982).

Pressure-sensitive adhesives are generally chemically composed of rubber-resin materials, acrylic resins, polyurethane resins, silicone resins, and the like. Amongst the various patent literature describing compositions and improvements in pressure-sensitive adhesive formulations are Reissue U.S. Pat. Nos. 24,906; 2,652,351; 3,740,366; 3,299,010; 3,770,708; 3,701,758; 3,922,464; 3,931,087; 4,012,560; 4,077,926; 4,387,172; 4,418,120; 4,629,663; and the like. These classes of rubber resin, acrylic, silicone, and polyurethane pressure-sensitive adhesives as well as any other pressure-sensitive adhesives are generally useful in the present invention.

EXAMPLES

In the following examples all treatments were done using either a Model 2460 laser by Questek, Billerica, Mass. or a Model 102E laser by Lambda Physik of Acton, Mass. These lasers give equivalent outputs for the purposes of treating polymer films. The lasers were operated with either Ar plus Fluorine gas at an emission wavelength of 193nm or with Krypton plus Fluorine gas at an emission wavelength of 248nm and with a system of cylindrical lenses to control the exposed area of the sample and thus the energy density of the beam striking the sample. Each system was calibrated using a Model ED500 power meter by Gentech, Ste-Fog, Qc, Canada. Pulse width was approximately 15 nanoseconds for both lasers.

EXAMPLE 1

This example describes the treatment of a surface of a 0.1 mm thick poly(vinyl chloride) film. The composition of the film was 100 parts by weight of poly(vinyl chloride) having an average molecular weight of 320,000, thirty-seven (37) parts by weight of diisononyl phthalate, three (3) parts by weight of a stabilizer, 2,2'methylenebis(4-methyl-6-tert-butylphenol), and one (1) part by weight carbon black.

The samples of this film were subjected to 2 pulses from a 193 nm emitting ArF excimer laser at 10mJ/cm$^2$. Treated films were then first coated with a 5% solution of benzophenone in isopropanol, then coated with a 0.025 mm wet coating of trimethylol propane triacrylate monomer containing 1% by weight of an inert fluorocarbon surfactant. The samples were then cured by ultraviolet radiation at 200 watts under a nitrogen atmosphere. Film samples that were not treated with the excimer laser were identically coated.

Samples of both types of films were cut into 5 cm by 5 cm squares, weighed, placed into 100 ml of at 30:70, toluene:heptane solution and shaken for 2 hours at 40° C. After drying at 20° C. for 16 hours and reweighing, it was found that the non-treated samples lost approximately thirty percent of the plasticizer while the excimer treated samples lost less than 2% of the plasticizer.

EXAMPLE 2

The radiation treated article of Example 1 had the barrier layer coated from solvent with an acrylic pressure-sensitive adhesive comprising 93 parts isooctylacrylate, 7 parts acrylic acid, 16.4 parts hydrogenated resin ester (tackifier), and 3 parts bis-amide (cross-linking agent). The properties of the adhesive remained stable over an extended period of time. This was clearly in part due to the lack of plasticizer migration into the adhesive from the poly(vinyl chloride) film.

What is claimed is:

1. A process for reducing the migration of migratory materials from film comprising a semicrystalline polymer, said process comprising modifying the surface of a semicrystalline polymer by irradiating at least one surface of a semicrystalline polymer composition containing at least one migratory ingredient with radiation which is absorbed by said composition, controlling the intensity and fluence of said radiation exposure so that semicrystalline polymer on said surface is melted and there is ablation or volatilization of less than 0.1% by weight of the total weight of the polymer in melted areas, and allowing said melted polymer to cool at a rate which will form a quasi-amorphous polymeric area on said at least one surface, and then coating said at least one surface with a polymer that is less penetrable by said migratory ingredient in said composition than is said composition.

2. The process of claim 1 wherein melting occurs to a depth of at least 5 nm and said polymer comprises poly(vinyl chloride).

3. The process of claim 1 wherein melting occurs to a depth of at least 10 nm, said polymer comprises poly(vinyl chloride) and said migratory material comprises a plasticizer.

4. The process of claim 1 wherein said second polymer comprises an acrylic polymer or polyurethane.

5. The process of claim 2 wherein said poly(vinyl chloride) is in the form of a sheet or film and said melting occurs to a depth of from 20 to 250 nm.

6. The process of claim 3 wherein said poly(vinyl chloride) is in the form of a sheet or film and said melting occurs to a depth of from 20 to 250 nm.

7. The process of claim 4 wherein said poly(vinyl chloride) is in the form of a sheet or film and said melting occurs to a depth of from 20 to 250 nm.

* * * * *

UNITED STATES PATENT AND TRADEMARK OFFICE
CERTIFICATE OF CORRECTION

PATENT NO. : 4,902,378

DATED : February 20, 1990

INVENTOR(S) : Ouderkirk, Simpson, Warner & Dunn

It is certified that error appears in the above-identified patent and that said Letters Patent is hereby corrected as shown below:

Column 5, line 65, "pots" should be --spots--.

Abstract, line 3, "polymer of copolymer" should be --polymer or copolymer--.

Signed and Sealed this

Fourteenth Day of May, 1991

*Attest:*

HARRY F. MANBECK, JR.

*Attesting Officer*         *Commissioner of Patents and Trademarks*